E. E. GOOD.
MILK CAN ATTACHMENT FOR MILKING APPARATUS.
APPLICATION FILED JAN. 27, 1910.
991,776.
Patented May 9, 1911.
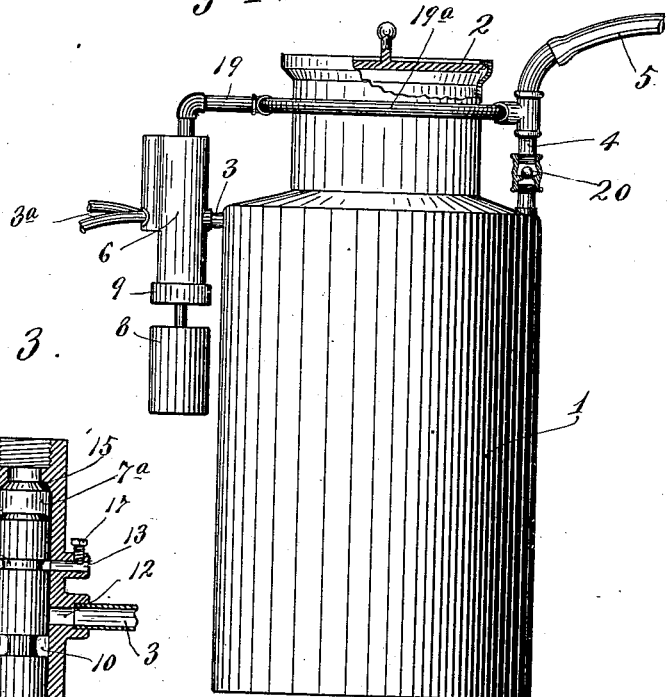
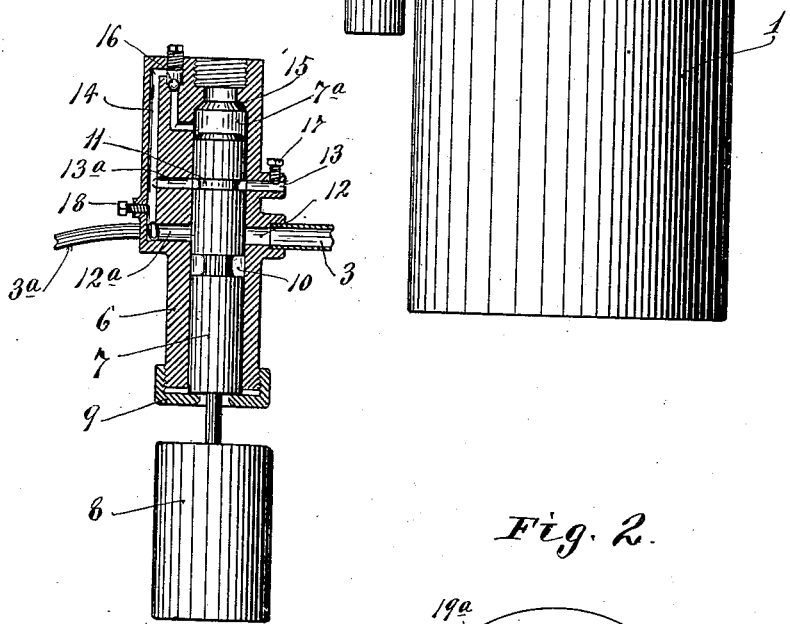
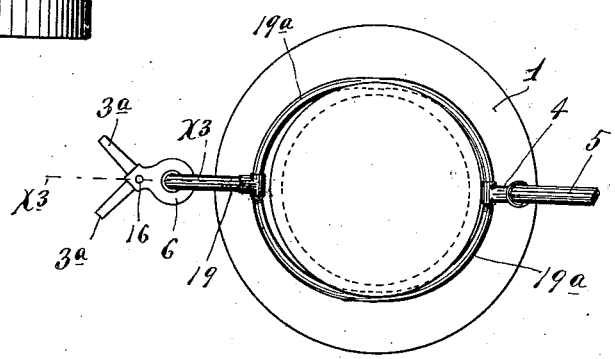
Witnesses.
A. H. Opsahl.
W. H. Souba.
Inventor.
Ezra. E. Good.
By his Attorneys.
Williamson & Merchant

UNITED STATES PATENT OFFICE.

EZRA E. GOOD, OF WATERLOO, IOWA.

MILK-CAN ATTACHMENT FOR MILKING APPARATUS.

991,776.  Specification of Letters Patent.  Patented May 9, 1911.

Application filed January 27, 1910. Serial No. 540,327.

*To all whom it may concern:*

Be it known that I, EZRA E. GOOD, a citizen of the United States, residing at Waterloo, in the county of Blackhawk and State of Iowa, have invented certain new and useful Improvements in Milk-Can Attachments for Milking Apparatus; and I do hereby declare the following to be a full, clear, and exact description of the invention, such as will enable others skilled in the art to which it appertains to make and use the same.

My invention relates to milking apparatus of the type wherein pulsating devices are employed, and has for its object to provide means for preventing air from entering the can when air is admitted into the system, by the pulsating device, for the purpose of relieving the drawing tension on the teat cups.

Particularly, this invention is designed as an improvement on the mechanism disclosed and broadly claimed in my prior Patent 937,789, of date October 26, 1909, entitled milking apparatus.

In the accompanying drawings which illustrate the invention, like characters indicate like parts throughout the several views.

Referring to the drawings, Figure 1 is a view in side elevation, with some parts broken away, showing a milk can and the improved connections for preventing air from entering the said milk can; Fig. 2 is a plan view of the parts shown in Fig. 1; and Fig. 3 is a vertical section taken on the line $x^3$ $x^3$ of Fig. 2.

The numeral 1 indicates a milk can which is provided with a removable cover 2 of the usual or any suitable construction which will make the can approximately air-tight when applied. Each can 1 is provided with a milk inlet pipe 3 and with an air outlet or suction pipe 4, which latter is adapted to be connected by a flexible tube 5 to one of the branch suction pipes, not shown, of the milking apparatus.

A vertically disposed tubular valve seat 6, preferably in the form of a casing, is interposed in or connected between the main section 3 and branch sections $3^a$ of the milk inlet pipe.

Working vertically within the cavity $7^a$ is a cut-off valve 7 of the plunger type, that is normally gravity held in its lowermost position, by a weight 8. The downward movement of the valve 7 is, as shown, limited by a perforated cap 9 screwed on the lower end of the said valve casing 6. At its intermediate portion, the cut-off valve 7 is provided with a main annular port 10 and above the latter with a secondary annular port 11. In the normal or lowermost position of the valve 7, its port 10 is below diametrically opposite ports 12—$12^a$ formed in the valve casing 6, and the port 11 is then in registration with air intake ports 13—$13^a$ also formed in said casing. The port 12 is directly connected to the milk intake pipe 3, the port $12^a$ is directly connected to the branch milk intake pipes $3^a$, the port 13 opens to the atmosphere, and the port $13^a$ connects to a vertically extended air intake conduit 14 formed in the said casing 6. The conduit 14 connects the ports $12^a$ and $13^a$ and, at its upper end, it opens into the valve seat cavity $7^a$ at a point considerably below the valve seat proper 15, which latter is formed at the extreme upper end of the cavity $7^a$ and is adapted to be closed by the upper end of the said valve 7, when the latter is moved to its extreme uppermost position. Working in the upper portion of the air conduit 14 is a check valve 16. The port 13 is adapted to be opened and closed to a greater or less extent by a small valve shown in the form of a screw 17, and a similar screw or choke valve 18 is arranged to open and close the lower portion of the conduit 14, all for purposes which will be hereinafter described.

The upper extremity of the cavity $7^a$ of the valve casing 6 is connected to one extremity of a by-pass pipe 19, the other end of which is connected to the air suction pipe 4. As shown, the intermediate portion $19^a$ of the pipe 19 is bifurcated so that it embraces the neck of the can 1. In the air suction pipe 4, below the pipe 19, is a check valve 20 which permits air to be drawn from the can through the pipe 4 but checks a return of the reverse flow.

The operation of the device is substantially as follows: When suction is produced in the pipe 4, the check valve 16 will be held closed while the check valve 20 will freely open, thereby causing the suction or partial vacuum produced to be effective in the can 1 and through the by-pass 19 on the upper end of the cut-off valve 7; and when this partial vacuum or suction is sufficient to overcome the weight 8, the said cut-off valve 7 will be raised into its extreme uppermost position against the valve seat 15 and the valve port 10 will register with the ports 12 and 12ª, thereby opening communication between the milk can and the milk branch tubes or extensions 3ª. This, as is evident, will cause milk to be drawn into the milk can, and this drawing action will continue until air is admitted into the tubes 4—5 by the pulsating device, and from thence through the by-pass pipe 19 into the upper extremity of the cavity 7ª. This admission of air or reduction of vacuum or suction will permit the cut-off valve 7 to be dropped back into its normal or lowermost position under the action of its weight 8. When the said cut-off valve 7 is dropped or moved downward, it first cuts off communication between the ports 12—12ª, thereby closing the milk intake passage to the can; next, it uncovers the upper end of the conduit 14 and, finally, as it reaches its extreme lowermost position, it opens up communication between the ports 13—13ª. The opening of the conduit or long port 14 permits a flow of air admitted by the pulsating device, into the branch milk supply tubes 3ª, the opening of the ports 13—13ª affords an auxiliary supply of fresh air direct from the atmosphere into the said conduit 14 and from thence to the branch suction tubes 3ª. It is important to here note that both the direct and indirect air intake ports above noted, to-wit, the ports 13 and 14, are kept closed by the cut-off valve 7 at all times when the milk intake ports 12—12ª are in communication. This prevents even the slightest admission of air from being drawn into the can under a downward movement of the cut-off valve, whereas, in the said prior patent above noted, there was a short interval of time while the cut-off valve was making its downward movement when a slight amount of air may be drawn into the milk can. The auxiliary or direct air intake passage afforded by the ports 13, 13ª and 11 insures a very quick release of the vacuum pressure, and this quick release, as is well understood, is essential to a high milking efficiency. Furthermore, this auxiliary supply of air is independent of the supply of air afforded by the pulsating device and very greatly reduces the amount of work necessarily done by the pulsating device. This latter noted feature is highly important in milking systems wherein it is desired to control the milking of a large number of cows from a single pulsating device. By adjustment of the screw valves 17 and 18, the proportion of air taken in from the direct air supply passage and through the pulsating device, and also the total amount of air taken in from the two sources, may be regulated at will. Also, by the proper adjustments of the said choke valves or screws, the amount of suction or vacuum pressure produced at the teat cups connected to any particular can may be increased or decreased at will, independently of the tension put upon the teat cups connected to other cans. This feature, as is obvious, is important. For instance, it permits the ready adjustment of the teat cups to different sized teats and also compensates for different lengths of the suction pipe or, in other words, for the remoteness or closeness of the can to the pulsating device.

What I claim is:

1. In a milking apparatus, the combination with a can, of a milk conduit leading into said can, an air suction conduit leading from said can, a by-passage connecting said air suction conduit to said milk conduit independently of said can, and a suction controlled valve mechanism arranged to open and close said milk conduit and by-passage in alternate order and to hold said milk conduit closed at all times when said by-passage is open, substantially as described.

2. In a milking apparatus, the combination with a can, of a milk conduit leading into said can, an air suction conduit leading from said can, a by-passage connecting said air suction conduit to said milk conduit independently of said can, a suction controlled valve mechanism arranged to open and close said milk conduit and by-passage in alternate order and to hold said milk conduit closed at all times when said by-passage is open, and a check valve in said air suction conduit between said can and said by-passage, substantially as described.

3. In a milking apparatus, the combination with a can, of a milk conduit leading into said can, an air suction conduit leading from said can, a by-passage connecting said air suction conduit to said milk conduit independently of said can, a suction controlled valve mechanism arranged to open and close said milk conduit and by-passage in alternate order and to hold said milk conduit closed at all times when said by-passage is open, a check valve in said air suction conduit between said can and said by-passage, and a check valve in said by-passage, substantially as described.

4. In a milking apparatus, the combination with a can, of a milk conduit leading into said can, an air suction conduit leading from said can, a by-passage connecting said air suction pipe to said milk pipe independently of said can, a check valve in said air suction pipe between said can and said by-passage, a valve casing having a port constituting a part of said milk conduit and in which a part of said by-passage is located, a plunger valve working in said casing and subject to the varying pressure in said by-passage, and which valve is arranged to open and close said milk passage and by-passage in alternate order and to always close said milk passage when said by-passage is open, substantially as described.

5. In a milking apparatus, the combination with a can, and a valve casing, of a milk conduit leading into said can through said valve casing, an air suction pipe leading from said can, a plunger valve seat in said casing, a weighted plunger valve working in said seat, a by-passage formed in part in said valve casing and connecting said air suction pipe to said plunger valve seat and to said milk conduit, and an auxiliary air inlet extending into said valve casing and into said by-passage, and which plunger valve is arranged in one position to close said milk conduit and open said by-passage and auxiliary air inlet and in another position to open said milk conduit and close said by-passage and auxiliary air inlet, substantially as described.

In testimony whereof I affix my signature in presence of two witnesses.

EZRA E. GOOD.

Witnesses:
F. D. MERCHANT,
HARRY D. KILGORE.

---

Copies of this patent may be obtained for five cents each, by addressing the "Commissioner of Patents, Washington. D. C."